US012045949B2

(12) United States Patent
Li (10) Patent No.: US 12,045,949 B2
(45) Date of Patent: Jul. 23, 2024

(54) METHOD, APPARATUS, COMPUTER DEVICE AND STORAGE MEDIUM FOR ADJUSTING BRIGHTNESS OF MOSAICED IMAGES

(71) Applicant: Black Sesame Technologies Inc., San Jose, CA (US)

(72) Inventor: Wenxue Li, Wuhan (CN)

(73) Assignee: Black Sesame Technologies Inc., San Jose, CA (US)

( * ) Notice: Subject to any disclaimer, the term of this patent is extended or adjusted under 35 U.S.C. 154(b) by 193 days.

(21) Appl. No.: 17/164,444

(22) Filed: Feb. 1, 2021

(65) Prior Publication Data
US 2022/0036507 A1      Feb. 3, 2022

(30) Foreign Application Priority Data

Jul. 30, 2020  (CN) .......................... 202010751198.2

(51) Int. Cl.
*G06T 3/40* (2024.01)
*G06T 3/4038* (2024.01)
(Continued)

(52) U.S. Cl.
CPC .............. *G06T 3/4038* (2013.01); *G06T 5/90* (2024.01); *G06T 7/90* (2017.01); *G06T 2207/30252* (2013.01)

(58) Field of Classification Search
CPC ......... G06T 3/4038; G06T 5/007; G06T 7/90; G06T 2207/30252
See application file for complete search history.

(56) References Cited

U.S. PATENT DOCUMENTS

| 11,616,909 B2* | 3/2023 | Lu ........................ H04N 17/002 |
| | | 348/36 |
| 2003/0086002 A1* | 5/2003 | Cahill ..................... G06T 5/009 |
| | | 348/218.1 |

(Continued)

FOREIGN PATENT DOCUMENTS

| CN | 102937454 A | 2/2013 |
| CN | 105245785 A | 1/2016 |

(Continued)

OTHER PUBLICATIONS

Liu et al. ("Photometric alignment for surround view camera system," IEEE International Conference on Image Processing; Date of Conference: Oct. 27-30, 2014) (Year: 2014).*

(Continued)

*Primary Examiner* — Manav Seth
(74) *Attorney, Agent, or Firm* — Fish & Richardson P.C.

(57) ABSTRACT

The disclosure provides a method for improving brightness of mosaiced images, which comprises the following steps: determining a first common area shared by a first image to be mosaiced and a second image to be mosaiced, calculating color average values of the first image to be mosaiced and the second image to be mosaiced in the first common area respectively, determining a target average value of the first common area based on the two color average values, and determining an adjustment parameter of the first common area according to the target average value and the color average values; determining a second common area shared by the second image to be mosaiced and a third image to be mosaiced, calculating color average values of the second image to be mosaiced and the third image to be mosaiced in the second common area, determining a target average value of the second common area based on the two color average values, and determining an adjustment parameter of the second common area according to the target average value (Continued)

and the color average values; determining an adjustment parameter of the central area of the second image to be mosaiced according to the adjustment parameters of the two common areas; adjusting display images of respective areas based on the above adjustment parameters.

20 Claims, 6 Drawing Sheets

(51) Int. Cl.
*G06T 5/90* (2024.01)
*G06T 7/90* (2017.01)

(56) References Cited

U.S. PATENT DOCUMENTS

| | | | | |
|---|---|---|---|---|
| 2005/0169555 | A1* | 8/2005 | Hasegawa | H04N 1/3876 |
| | | | | 382/167 |
| 2006/0038894 | A1* | 2/2006 | Chan | H04N 23/70 |
| | | | | 348/222.1 |
| 2006/0056724 | A1* | 3/2006 | Le Dinh | H04N 19/51 |
| | | | | 375/E7.185 |
| 2006/0170789 | A1* | 8/2006 | Takahashi | H04N 23/88 |
| | | | | 348/223.1 |
| 2011/0074957 | A1* | 3/2011 | Kiyohara | G06V 10/267 |
| | | | | 348/148 |
| 2013/0208140 | A1* | 8/2013 | Quast | H04N 23/698 |
| | | | | 348/229.1 |
| 2016/0217731 | A1* | 7/2016 | Joo | G09G 3/3208 |
| 2019/0251663 | A1 | 8/2019 | Yuan et al. | |
| 2019/0281215 | A1 | 9/2019 | Chan et al. | |
| 2022/0392112 | A1* | 12/2022 | Almog | H04N 19/119 |
| 2023/0419437 | A1* | 12/2023 | Nash | H04N 25/60 |

FOREIGN PATENT DOCUMENTS

| | | | | | |
|---|---|---|---|---|---|
| CN | 105354796 | A | * | 2/2016 | G06T 3/4038 |
| CN | 105981367 | A | * | 9/2016 | B60K 35/00 |
| CN | 107330872 | A | | 11/2017 | |
| CN | 108010005 | A | * | 5/2018 | G06T 5/50 |
| CN | 109035134 | A | | 12/2018 | |
| CN | 109461128 | A | | 3/2019 | |
| CN | 109598673 | A | | 4/2019 | |
| CN | 110211076 | A | | 9/2019 | |
| CN | 110381255 | A | * | 10/2019 | G06T 3/0012 |
| CN | 110717962 | A | | 1/2020 | |
| CN | 110753217 | A | | 2/2020 | |
| CN | 111263951 | A | * | 6/2020 | B60R 1/00 |
| EP | 2012271 | A2 | * | 1/2009 | B60R 1/00 |
| KR | 20140085892 | A | * | 7/2014 | |
| KR | 101909392 | B1 | * | 10/2018 | |
| WO | WO-2018020560 | A1 | * | 2/2018 | A61B 1/00009 |

OTHER PUBLICATIONS

Lai et al. ("Efficient Photometric Alignment for Around View Monitor System," IEEE 13th International Conference on ASIC; Date of Conference: Oct. 29, 2019-Nov. 1, 2019) (Year: 2019).*
Lin et al., "Automatic color equalization algorithm of multi-camera image mosaic," Journal of Computer Applications, Dec. 2010, 30(12):3236-3237 (with English abstract).
Lin, "Design and implementation of image stitching system based on SIFT algorithm," Huazhong University of Science and Technology, Sep. 2018, (12)138-245 (English summary only).
Lu et al., "Stitching aberration elimination algorithm based on projection model and image fusion," Computer Applications and Software, Jul. 2016, 33(7):217-221 (with English abstract).
Office Action in Chinese Appln. No. 202010751198.2, dated Aug. 14, 2023, 11 pages (with partial English translation).
Xie et al., "Guided color consistency optimization for image mosaicking," ISPRS Journal of Photogrammetry and Remote Sensing, 2018, 135:43-59.

* cited by examiner

METHOD, APPARATUS, COMPUTER DEVICE AND STORAGE MEDIUM FOR ADJUSTING BRIGHTNESS OF MOSAICED IMAGES

FIELD OF THE INVENTION

The present disclosure relates to the field of image processing, in particular to image processing used in an on-board panoramic look-around system.

BACKGROUND OF THE INVENTION

Figure 1:
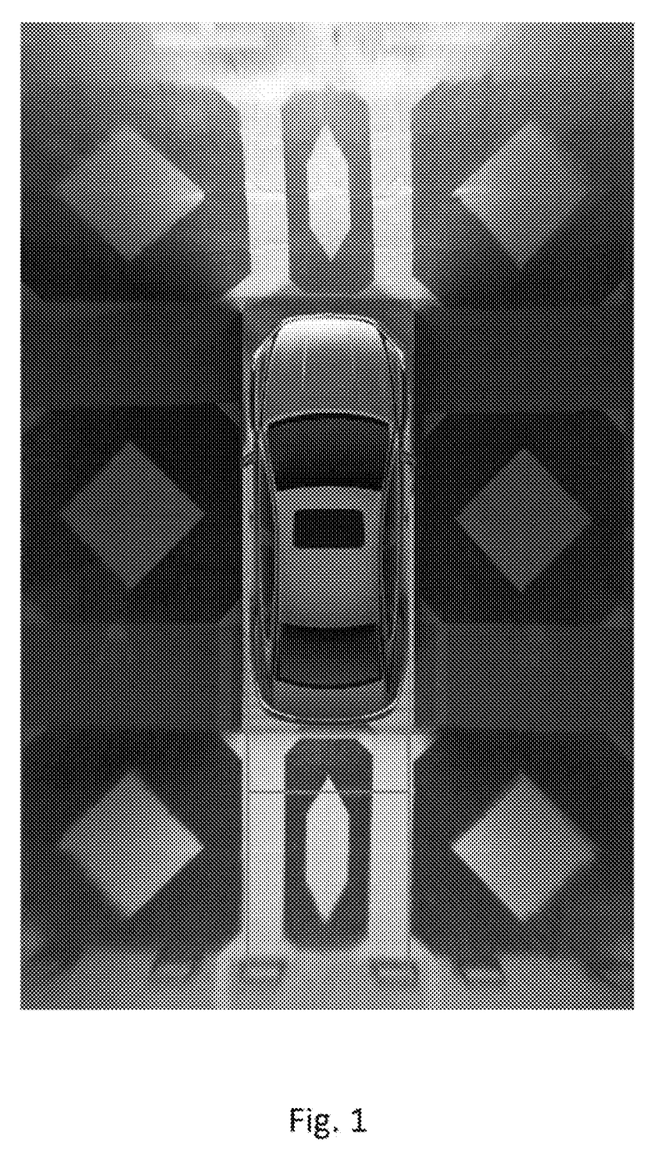
FIG. 1 shows an effect view of brightness inconsistency in prior art actual scene mosaicing.

In the on-board look-around algorithm, internal and external parameters of four cameras are obtained by calibration, and then original images of the cameras are projected to the ground by perspective transformation using these data, and then a panoramic image is obtained by mosaicing. Due to differences in imaging environments (shade, tail lights, etc.), lens differences and other reasons, the original data of different cameras have brightness differences in the same scene, which leads to inconsistent brightness in the mosaic area of the panoramic image and poor display effect. As shown in FIG. 1, the brightness of the image in different areas is obviously inconsistent.

SUMMARY OF THE INVENTION

Therefore, it is necessary to provide a method, an apparatus, a computer device and a storage medium for adjusting the brightness of mosaic images in order to solve the problem of inconsistent brightness of mosaiced images.

The disclosure relates to a method for improving brightness of mosaiced images, which comprises the following steps:
  acquiring a first image to be mosaiced and a second image to be mosaiced, determining a first common area shared by the first image to be mosaiced and the second image to be mosaiced and calculating a first color average value of the first image to be mosaiced in the first common area and a second color average value of the second image to be mosaiced in the first common area;
  determining a target average value of the first common area based on the first color average value and the second color average value, and determining an adjustment parameter of the first common area according to the target average value of the first common area and the first color average value and/or the second color average value;
  acquiring a third image to be mosaiced, determining a second common area shared by the second image to be mosaiced and the third image to be mosaiced, and calculating a third color average value of the second image to be mosaiced in the second common area and a fourth color average value of the third image to be mosaiced in the second common area;
  determining a target average value of the second common area based on the third color average value and the fourth color average value, and determining an adjustment parameter of the second common area according to the target average value of the second common area and the third color average value and/or fourth color average value;
  determining an adjustment parameter of a first central area of the second image to be mosaiced located between the first common area and the second common area according to the adjustment parameter of the first common area and the adjustment parameter of the second common area;
  adjusting a display image of the first common area based on the adjustment parameter of the first common area, adjusting a display image of the second common area based on the adjustment parameter of the second common area, and adjusting a display image of the first central area based on the adjustment parameter of the first central area.

In one embodiment, the method further comprises:
  acquiring a fourth image to be mosaiced, determining a third common area shared by the fourth image to be mosaiced and the third image to be mosaiced, and calculating a fifth color average value of the third image to be mosaiced in the third common area and a sixth color average value of the fourth image to be mosaiced in the third common area;
  determining a target average value of the third common area based on the fifth color average value and the sixth color average value, and determining an adjustment parameter of the third common area according to the target average value of the third common area and the fifth color average value and/or sixth color average value;
  determining an adjustment parameter of a second central area of the third image to be mosaiced between the second common area and the third common area according to the adjustment parameter of the second common area and the adjustment parameter of the third common area;
  adjusting a display image of the third common area based on the adjustment parameter of the third common area, and adjusting a display image of the second central area based on the adjustment parameter of the second central area.

In one embodiment, the method further comprises:
  determining a fourth common area shared by the fourth image to be mosaiced and the first image to be mosaiced, and calculating a seventh color average value of the fourth image to be mosaiced in the fourth common area and an eighth color average value of the first image to be mosaiced in the fourth common area;
  determining a target average value of the fourth common area based on the seventh color average value and the eighth color average value, and determining an adjustment parameter of the fourth common area according to the target average value of the fourth common area and the seventh color average value and/or eighth color average value;
  determining an adjustment parameter of a third central area of the fourth image to be mosaiced located between the third common area and the fourth common area according to the adjustment parameter of the third common area and the adjustment parameter of the fourth common area;
  determining an adjustment parameter of a fourth central area of the first image to be mosaiced located between the fourth common area and the first common area according to the adjustment parameter of the fourth common area and the adjustment parameter of the first common area;
  adjusting a display image of the fourth common area based on the adjustment parameter of the fourth common area, adjusting a display image of the third central area based on the adjustment parameter of the third central area, and adjusting a display image of the fourth central area based on the adjustment parameter of the fourth central area.

In an embodiment, the first image to be mosaiced, the second image to be mosaiced, the third image to be mosaiced and the fourth image to be mosaiced are images around a vehicle.

In an embodiment, adjusting the display image of the first common area based on the adjustment parameter of the first common area comprises adjusting the first image to be mosaiced or the second image to be mosaiced using the adjustment parameter of the first common area to acquire the display image of the first common area;

adjusting the display image of the second common area based on the adjustment parameter of the second common area comprises adjusting the second image to be mosaiced or the third image to be mosaiced using the adjustment parameter of the second common area to acquire the display image of the second common area;

adjusting the display image of the third common area based on the adjustment parameter of the third common area comprises adjusting the third image to be mosaiced or the fourth image to be mosaiced using the adjustment parameter of the third common area to acquire the display image of the third common area;

adjusting the display image of the fourth common area based on the adjustment parameter of the fourth common area comprises adjusting the fourth image to be mosaiced or the first image to be mosaiced using the adjustment parameter of the fourth common area to acquire the display image of the fourth common area.

In an embodiment, determining the adjustment parameter of the first central area of the second image to be mosaiced located between the first common area and the second common area according to the adjustment parameter of the first common area and the adjustment parameter of the second common area comprises:

taking an average value of the adjustment parameter of the first common area and the adjustment parameter of the second common area as the adjustment parameter of the first central area.

In an embodiment, determining the adjustment parameter of the first central area of the second image to be mosaiced located between the first common area and the second common area according to the adjustment parameter of the first common area and the adjustment parameter of the second common area comprises:

determining a plurality of adjustment parameters of the first central area by adopting a linear interpolation algorithm according to the adjustment parameter of the first common area and the adjustment parameter of the second common area.

In one embodiment, distortion correction and perspective projection processing are performed on original images to acquire the first image to be mosaiced, the second image to be mosaiced, the third image to be mosaiced and the fourth image to be mosaiced.

In an embodiment, the first image to be mosaiced, the second image to be mosaiced, the third image to be mosaiced and the fourth image to be mosaiced are top views in a certain direction obtained by respectively projecting the original images of a plurality of cameras onto the ground using internal parameters and external parameters of the cameras;

the internal parameters can comprise focal length, pixel size and distortion coefficient;

the external parameters may include the position and rotation direction of the camera.

In one embodiment, the first color average value, the second color average value, the third color average value and the fourth color average value comprises one or more of red color average value, green color average value and blue color average value.

In one embodiment, the method further comprises:

acquiring at least one of the adjustment parameter of the first common area, the adjustment parameter of the second common area and the adjustment parameter of the first central area of the Nth frame, wherein N is a natural number greater than or equal to 1;

acquiring at least one of the adjustment parameter of the first common area, the adjustment parameter of the second common area and the adjustment parameter of the first central area of the (N+M)th frame, wherein M is a natural number greater than 2;

according to at least one of the adjustment parameter of the first common area, the adjustment parameter of the second common area and the adjustment parameter of the first central area of the Nth frame and at least one of the adjustment parameter of the first common area, the adjustment parameter of the second common area and the adjustment parameter of the first central area of the N+Mth frame, determining an adjustment parameter of each frame between the Nth frame and the N+Mth frame based on a first-order filtering algorithm.

In one embodiment, the disclosure relates to an apparatus for improving brightness of mosaiced images, which comprises:

a first determination module configured to acquire a first image to be mosaiced and a second image to be mosaiced, determine a first common area shared by the first image to be mosaiced and the second image to be mosaiced and calculate a first color average value of the first image to be mosaiced in the first common area and a second average color value of the second image to be mosaiced in the first common area;

a second determination module configured to determine a target average value of the first common area based on the first color average value and the second color average value, and determine an adjustment parameter of the first common area according to the target average value of the first common area and the first color average value and/or the second color average value;

a first calculation module configured to acquire a third image to be mosaiced, determine a second common area shared by the second image to be mosaiced and the third image to be mosaiced, and calculate a third color average value of the second image to be mosaiced in the second common area and a fourth color average value of the third image to be mosaiced in the second common area;

a third determination module configured to determine a target average value of the second common area based on the third color average value and the fourth color average value, and determine an adjustment parameter of the second common area according to the target average value of the second common area and the third color average value and/or fourth color average value;

a fourth determination module configured to determine an adjustment parameter of the first central area of the second image to be mosaiced located between the first common area and the second common area according to the adjustment parameter of the first common area and the adjustment parameter of the second common area;

an adjustment module configured to adjust a display image of the first common area based on the adjustment parameter of the first common area, adjust a display image of the second common area based on the adjustment parameter of the second common area, and adjust a display image of the first central area based on the adjustment parameter of the first central area.

In an embodiment, the disclosure also relates to a computer device, which comprises a memory and a processor, wherein the memory stores a computer program, and the processor implements the method described in any one of the above embodiments when executing the computer program.

In an embodiment, the disclosure also relates to a computer-readable storage medium on which a computer program is stored, and the computer program, when executed by a processor, implements the method as claimed in any one of the above embodiments.

In order to solve the brightness inconsistency in the mosaic area of a panoramic image, the present disclosure proposes a brightness consistency adjustment algorithm, which adjusts the brightness of the first to fourth images to be mosaiced before mosaicing, thus improving the brightness consistency of the panoramic image.

DETAILED DESCRIPTION OF THE INVENTION

In order to make the purpose, technical solutions and advantages of the disclosure clearer, the application will be further described in detail with reference to the drawings and examples. The specific embodiments described here are only used to explain the application, not used to limit the application.

Figure 2:
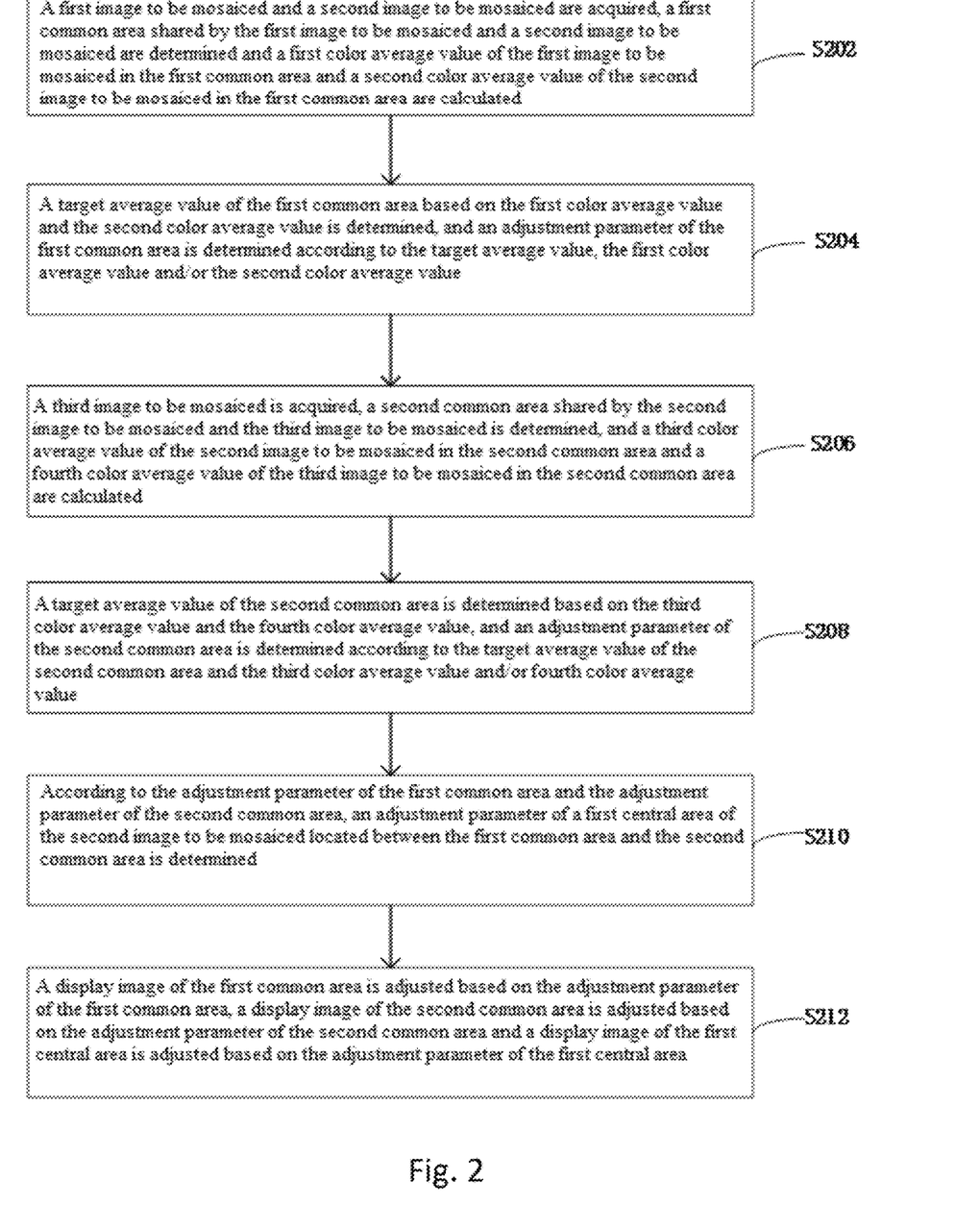
FIG. 2 shows a flowchart according to one embodiment of the present disclosure.
Figure 3:
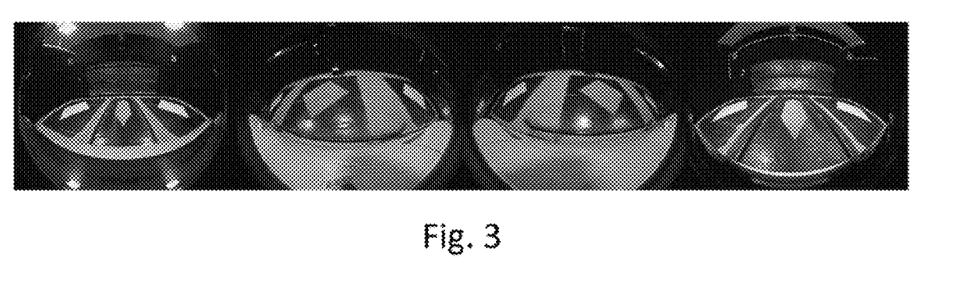
FIG. 3 shows a schematic view of four original views.
Figure 4:
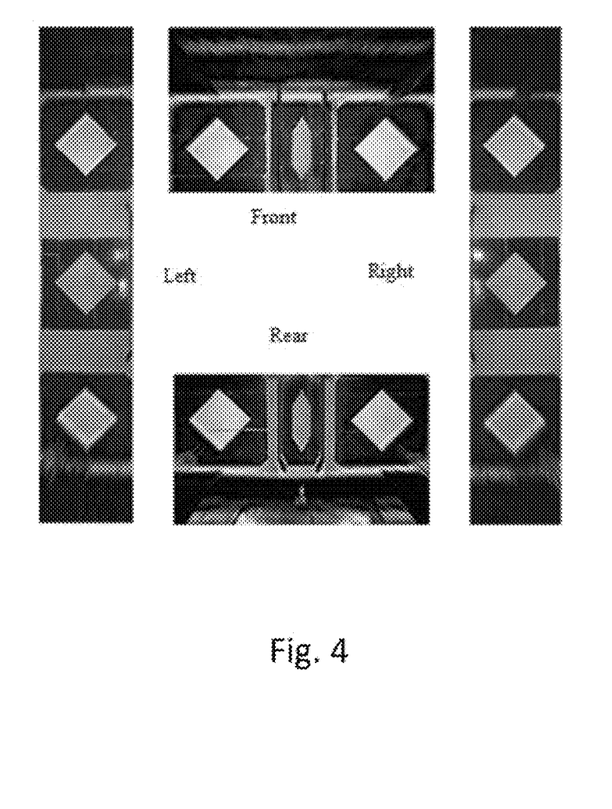
FIG. 4 shows a schematic view of four top views corresponding to the four original views in FIG. 3.
Figure 5:
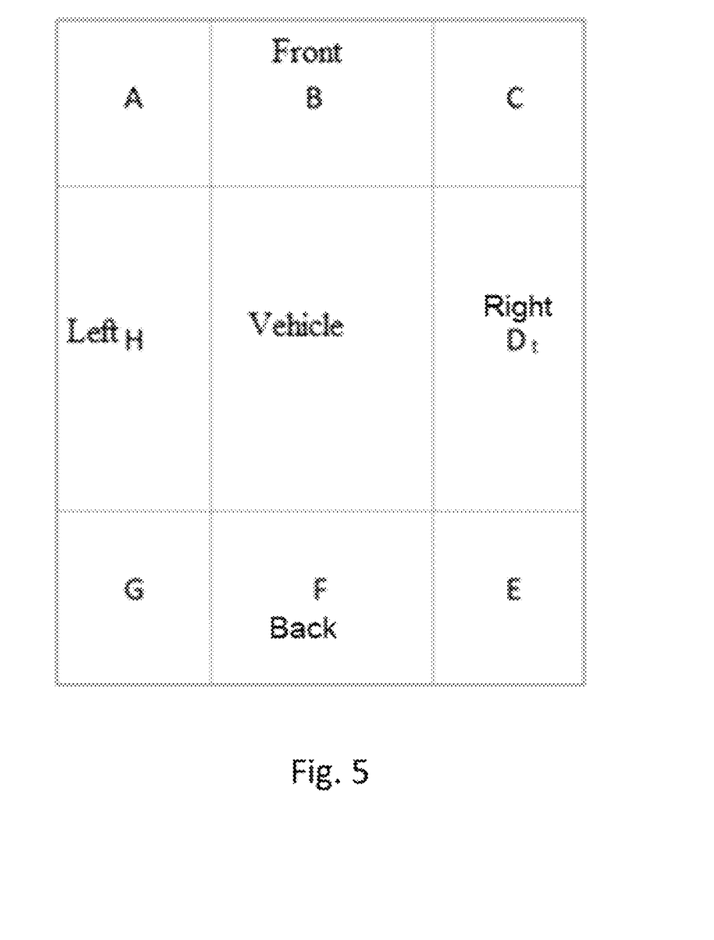
FIG. 5 is a schematic view showing the mosaiced state of the four top views in FIG. 4.

In order to solve the problem of brightness inconsistency in the mosaic area of panoramic images, the present disclosure proposes a brightness consistency adjustment algorithm, which adjusts brightness of camera original data and then mosaics images, thus improving the brightness consistency of mosaiced images. In one embodiment, the method comprises the following steps:

S202: a first image to be mosaiced and a second image to be mosaiced are acquired, a first common area shared by the first image to be mosaiced and a second image to be mosaiced are determined and a first color average value of the first image to be mosaiced in the first common area and a second color average value of the second image to be mosaiced in the first common area are calculated;

Specifically, referring to FIG. 5, in one embodiment, the first image to be mosaiced (A,B,C) and the second image to be mosaiced (C,D,E) are a front side image and a right side image acquired by the vehicle, respectively. The first common area (C) shared by the first image to be mosaiced and the second image to be mosaiced is determined, and the first color average value $\{F_R^{(C)}, F_G^{(C)}, F_B^{(C)}\}$ of the first image to be mosaiced (A,B,C) and the second color average value $\{R_R^{(C)}, R_G^{(C)}, R_B^{(C)}\}$ of the second image to be mosaiced (C,D,E) in the first common area are calculated.

S204: a target average value of the first common area based on the first color average value and the second color average value is determined, and an adjustment parameter of the first common area is determined according to the target average value, the first color average value and/or the second color average value;

Specifically, the target average value $R_C'$ of the first common area (C) is determined based on the first color average value $\{F_R^{(C)}, F_G^{(C)}, F_B^{(C)}\}$ and the second color average value $\{R_R^{(C)}, R_G^{(C)}, R_B^{(C)}\}$, and the adjustment parameter $\Delta R_C$ of the first common area is determined according to the target average value $R_C'$, the first color average value and/or the second color average value. For example, the adjustment parameter $\Delta R_C$ of the first common area is determined using a difference between the first color average value $\{F_R^{(C)}, F_G^{(C)}, F_B^{(C)}\}$ and/or the second color average value $\{R_R^{(C)}, R_G^{(C)}, R_B^{(C)}\}$ and the target average value $R_C'$ of the first common area.

S206: a third image to be mosaiced is acquired, a second common area shared by the second image to be mosaiced and the third image to be mosaiced is determined, and a third color average value of the second image to be mosaiced in the second common area and a fourth color average value of the third image to be mosaiced in the second common area are calculated;

Specifically, in one embodiment, the third image to be mosaiced is a rear side image (E, F, G) acquired by a vehicle, a second common area (E) shared by the second image to be mosaiced and the third image to be mosaiced is determined, a third color average value $\{R_R^{(E)}, R_G^{(E)}, R_B^{(E)}\}$ of the second image to be mosaiced in the second common area and a fourth color average value $\{B_R^{(E)}, B_G^{(E)}, B_B^{(E)}\}$ of the third image to be mosaiced in the second common area (E) are determined.

S208: a target average value of the second common area is determined based on the third color average value and the fourth color average value, and an adjustment parameter of the second common area is determined according to the target average value and the third color average value and/or fourth color average value;

Specifically, in one embodiment, the target average value $B_E'$ of the second common area (E) is determined based on the third color average value $\{R_R^{(E)}, R_G^{(E)}, R_B^{(E)}\}$ and the fourth color average value $\{B_R^{(E)}, B_G^{(E)}, B_B^{(E)}\}$, and the adjustment parameter $\Delta B_E$ of the second common area is determined according to the target average value, the third color average value and/or the fourth color average value. For example, the adjustment parameter $\Delta R_E$ of the second common area is determined using a difference between the target average value $B_E'$ of the second common area and the third color average value and/or the fourth color average value.

S210: according to the adjustment parameter of the first common area and the adjustment parameter of the second common area, an adjustment parameter of a first central area of the second image to be mosaiced located between the first common area and the second common area is determined;

Specifically, in one embodiment, according to the adjustment parameter $\Delta R_C$ of the first common area and the adjustment parameter $\Delta R_E$ of the second common area, the adjustment parameter of the first central area of the second image to be mosaiced (C, D, E) located between the first common area (C) and the second common area (E) is determined. For example, the average value of the adjustment parameter $\Delta R_C$ of the first common area and the adjustment parameter $\Delta R_E$ of the first central area is taken as the adjustment parameter of the first central area. Alternatively, according to the adjustment parameter ($\Delta R_C$) of the first common area and the adjustment parameter ($\Delta B_E$) of the second common area, a plurality of adjustment parameters are determined by adopting a linear interpolation algorithm.

S212: a display image of the first common area is adjusted based on the adjustment parameter of the first common area, a display image of the second common area is adjusted based on the adjustment parameter of the second common area and a display image of the first central area is adjusted based on the adjustment parameter of the first central area.

In one embodiment, adjusting the display image of the first common area (C) based on the adjustment parameter ($\Delta R_C$) of the first common area includes using the adjustment parameter ($\Delta R_C$) of the first common area to adjust the first image to be mosaiced (A, B, C) or the second image to be mosaiced (C, D, E) to acquire the display image of the first common area. For example, the color value of each pixel of the first image to be mosaiced or the color value of each pixel of the second image to be mosaiced is adjusted using the adjustment parameter of the first common area, so as to acquire a final display image.

Adjusting the display image of the second common area based on the adjustment parameter of the second common area includes adjusting the second image to be mosaiced or the third image to be mosaiced using the adjustment parameter of the second common area to acquire the display image of the second common area. For example, the color value of each pixel of the second image to be mosaiced or the color value of each pixel of the third image to be mosaiced is adjusted using the adjustment parameter of the second common area, so as to acquire the final display image.

In an embodiment, the method further comprises acquiring a fourth image to be mosaiced, determining a third common area shared by the fourth image to be mosaiced and the third image to be mosaiced, and calculating a fifth color average value of the third image to be mosaiced in the third common area and a sixth color average value of the fourth image to be mosaiced in the third common area.

Specifically, referring to FIG. 5, in one embodiment, the fourth image to be mosaiced (G, H, A) is a left side image acquired by the vehicle. The fourth image to be mosaiced is acquired, a third common area (G) shared by the fourth image to be mosaiced and the third image to be mosaiced is determined, and a fifth color average value $\{B_R^{(G)}, B_G^{(G)}, B_B^{(G)}\}$ of the third image to be mosaiced in the third common area and a sixth color average value $\{L_R^{(G)}, L_G^{(G)}, L_B^{(G)}\}$ of the fourth image to be mosaiced in the third common area are calculated.

A target average value of the third common area is determined based on the fifth color average value and the sixth color average value, and an adjustment parameter of the third common area is determined according to the target average value and the fifth color average value and/or the sixth color average value.

In one embodiment, the target average value $L_G'$ of the third common area is determined based on the fifth color average value $\{B_R^{(G)}, B_G^{(G)}, B_B^{(G)}\}$ and the sixth color average value $\{L_R^{(G)}, L_G^{(G)}, L_B^{(G)}\}$ and the adjustment parameter of the third common area is determined according to the target average value and the fifth color average value and/or sixth color average value. For example, the adjustment parameter of the third common area is determined using a difference between the target average value of the third common area and the fifth color average value and/or the sixth color average value.

According to the adjustment parameter of the second common area and the adjustment parameter of the third common area, an adjustment parameter of a second central area of the third image to be mosaiced located between the second common area and the third common area is determined.

In one embodiment, the adjustment parameter of the second central area of the third image to be mosaiced located between the second common area and the third common area is determined according to the adjustment parameter $\Delta B_E$ of the second common area and the adjustment parameter $\Delta B_G$ of the third common area. For example, the adjustment parameter of the second central area of the third image to be mosaiced located between the second common area and the third common area is determined using an average value of the adjustment parameter $\Delta B_E$ of the second common area and the adjustment parameter $\Delta B_G$ of the third common area. For example, the average value of the adjustment parameter $\Delta B_E$ of the second common area and the adjustment parameter $\Delta B_G$ of the third common area is taken as the adjustment parameter of the second central area. Alternatively, according to the adjustment parameter $\Delta B_E$ of the second common area and the adjustment parameter $\Delta B_G$ of the third common area, a linear interpolation algorithm is adopted to determine a plurality of adjustment parameters of the second central area.

A display image of the third common area is adjusted based on the adjustment parameter of the third common area, and a display image of the second central area is adjusted based on the adjustment parameter of the second central area.

For example, the color value of each pixel of the third image to be mosaiced is adjusted by using the adjustment parameter of the third common area, or the color value of each pixel of the second image to be mosaiced is adjusted using the adjustment parameter of the second central area, so as to acquire a final display image.

In an embodiment, the method further comprises determining a fourth common area A shared by the fourth image to be mosaiced and the first image to be mosaiced, and calculating a seventh color average value of the fourth image to be mosaiced in the fourth common area and an eighth color average value of the first image to be mosaiced in the fourth common area.

In an embodiment, the fourth common area shared by the fourth image to be mosaiced and the first image to be mosaiced is determined, and the seventh color average value $\{L_R^{(A)}, L_G^{(A)}, L_B^{(A)}\}$ of the fourth image to be mosaiced and the eighth color average value $\{F_R^{(A)}, F_G^{(A)}, F_B^{(A)}\}$ of the first image to be mosaiced in the fourth common area are calculated.

The target average value of the fourth common area is determined based on the seventh color average value and the eighth color average value, and the adjustment parameter of the fourth common area is determined according to the target average value and the seventh color average value and/or the eighth color average value.

In one embodiment, the target average value $F_A'$ of the fourth common area is determined based on the seventh color average value and the eighth color average value, and the adjustment parameter of the fourth common area is determined according to the target average value and the seventh color average value and/or the eighth color average value. For example, the adjustment parameter $\Delta F_A$ of the fourth common area is determined using a difference between the target average value of the fourth common area and the seventh color average value and/or the eighth color average value.

According to the adjustment parameter of the third common area and the adjustment parameter of the fourth common area, an adjustment parameter of the third central area of the fourth image to be mosaiced located between the third common area and the fourth common area is determined.

In an embodiment, the adjustment parameter of a third central area of the fourth image to be mosaiced located between the third common area (G) and the fourth common area (A) is determined according to the adjustment parameter $\Delta L_G$ of the third common area and the adjustment parameter $\Delta L_A$ of the fourth common area. For example, an average value of the adjustment parameter $\Delta L_G$ of the third common area and the adjustment parameter $\Delta L_A$ of the fourth common area is taken as the adjustment parameter of the third central area. Or alternatively, according to the adjustment parameter $\Delta L_G$ of the third common area and the adjustment parameter $\Delta L_A$ of the fourth common area, a linear interpolation algorithm is adopted to determine a plurality of adjustment parameters of the third central area.

According to the adjustment parameter of the fourth common area and the adjustment parameter of the first common area, an adjustment parameter of a fourth central area of the first image to be mosaiced located between the fourth common area and the first common area is determined.

In one embodiment, the color value of each pixel of the first image to be mosaiced located in the fourth common area is adjusted using the adjustment parameter of the fourth common area, and the color value of each pixel of the first image to be mosaiced located in the first common area is adjusted using the adjustment parameter of the first common area.

A display image of the fourth common area is adjusted based on the adjustment parameter of the fourth common area; a display image of the third central area is adjusted based on the adjustment parameter of the third central area, and a display image of the fourth central area is adjusted based on the adjustment parameter of the fourth central area.

In one embodiment, the color value of each pixel of the third image to be mosaiced is adjusted using the adjustment parameter of the fourth common area, or the color value of each pixel of the third image to be mosaiced is adjusted, so as to acquire a final display image.

In an embodiment, the first image to be mosaiced, the second image to be mosaiced, the third image to be mosaiced and the fourth image to be mosaiced are images around the vehicle. A panoramic image display of the vehicle is realized by mosaicing the images around the vehicle.

In one embodiment, distortion correction and perspective projection processing are performed on the original images to acquire the first image to be mosaiced, the second image to be mosaiced, the third image to be mosaiced and the fourth image to be mosaiced.

In an embodiment, the first image to be mosaiced, the second image to be mosaiced, the third image to be mosaiced and the fourth image to be mosaiced are top views in a certain direction obtained by projecting the original images of a plurality of cameras onto the ground using internal and external parameters of the cameras, wherein the internal parameters can include focal length, pixel size and distortion coefficient, the external parameters can include the position and rotation direction of the cameras.

In one embodiment, the first color average value, the second color average value, the third color average value, and the fourth color average value include one or more of red color average value, green color average value, and blue color average value.

Figure 6:
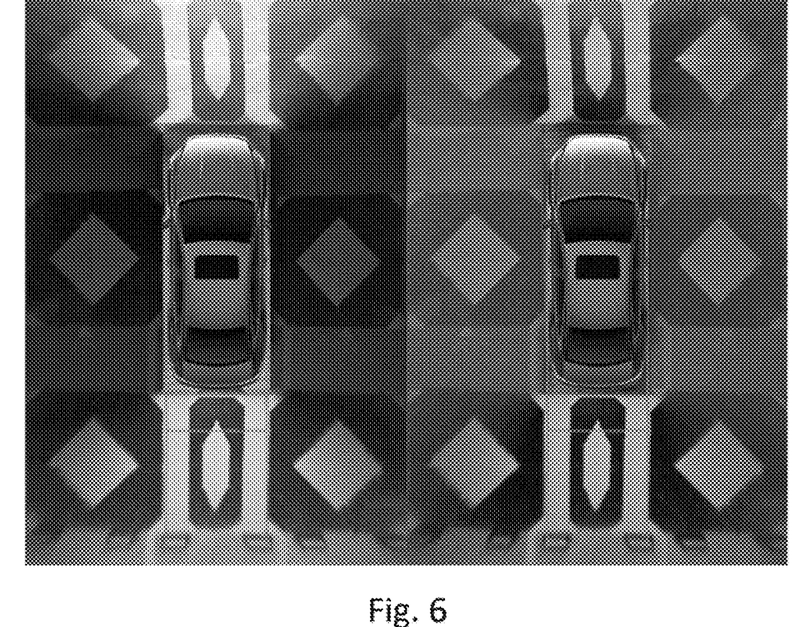
FIG. 6 shows an effect comparison view between a picture processed by the method according to an embodiment of the present disclosure and a picture processed by the prior art.

In one embodiment, based on the processing of the images around the vehicle, the color average value of a common area of two arbitrarily mosaic images is the same after adjustment, and the color values in the first central area, the second central area, the third central area and the fourth central area can be continuously adjusted. The brightness consistency of the panoramic view obtained by mosaicing the adjusted four top views is obviously better than that of the original mosaiced effect. As shown in FIG. 6, the left side is a bird's-eye view mosaiced by using the original views, and the right side is a bird's-eye view mosaiced by using this method.

A frame rate of a camera on the vehicle is generally 25-30 FPS, that is, 25-30 frames of input images are updated in one second. If the brightness of each frame of input image is adjusted by the above calculation, the amount of calculation is large, which leads to slow running speed of a look-around system. In addition, the adjustment parameters calculated in the current frame change greatly compared with the adjustment parameters calculated in the previous frame, which leads to flicker phenomenon of the adjusted results compared with the previous frame.

To solve this problem, the present disclosure proposes an improved method. In an embodiment, at least one of the adjustment parameter of the first common area, the adjustment parameter of the second common area and the adjustment parameter of the first central area of the Nth frame is acquired, wherein N is a natural number greater than or equal to 1. At least one of the adjustment parameter of the first common area, the adjustment parameter of the second common area and the adjustment parameter of the first central area of the (N+M)th frame is acquired, wherein M is a natural number greater than 2. According to at least one of the adjustment parameter of the first common area, the adjustment parameter of second common area and the adjustment parameter of the first central area of the Nth frame, and at least one of the adjustment parameter of the first common area, the adjustment parameter of the second common area and the adjustment parameter of the first central area of the N+Mth frame, the adjustment parameter of each frame between the Nth and N+M frames is determined based on a first-order filtering algorithm, so as to ensure smooth change of inter-frame adjustment parameters.

For example, at least one of the adjustment parameter of the first common area, the adjustment parameter of the second common area and the adjustment parameter of the first central area of the 10th frame is acquired.

At least one of the adjustment parameter of the first common area, the adjustment parameter of the second common area and the adjustment parameter of the first central area of the 10th+5th frame is acquired.

According to at least one of the adjustment parameter of the first common area, the adjustment parameter of the second common area and the adjustment parameter of the first central area of 10th frame and at least one of the adjustment parameter of the first common area, the adjustment parameter of the second common area and the adjustment parameter of the first central area of 15th frame, the adjustment parameters of each frame between 10th frame and 15th frame are determined based on a first-order filtering algorithm, so as to ensure smooth change of inter-frame adjustment parameters.

Figure 7:
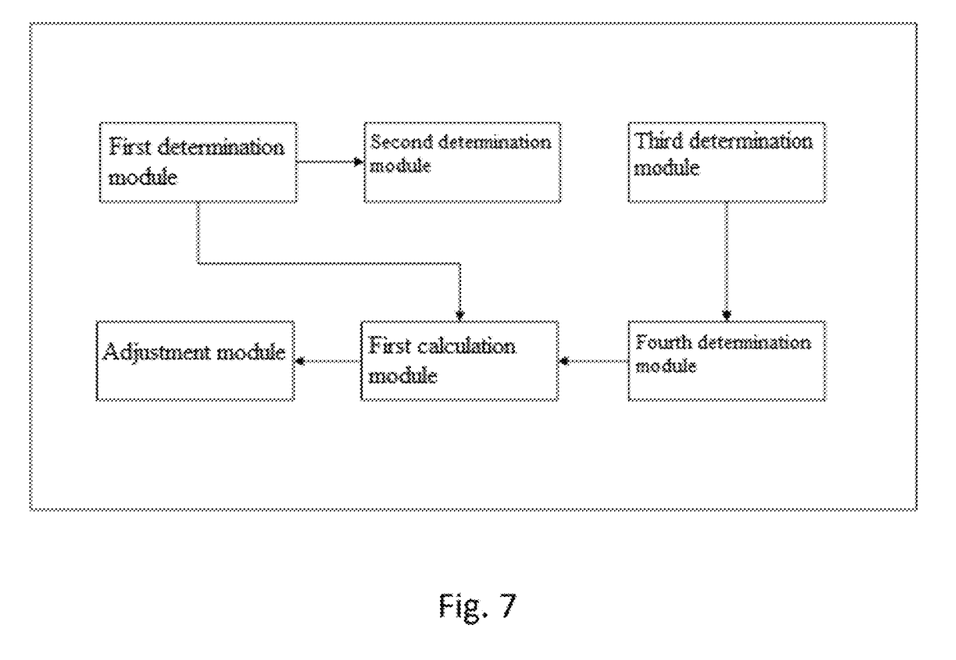
FIG. 7 shows a module diagram according to one embodiment of the present disclosure.

In one embodiment, as shown in FIG. 7, it provides an apparatus for improving brightness of mosaiced images, which comprises a first determination module, a second determination module, a first calculation module, a third calculation module, a fourth determination module and an adjustment module, wherein:

the first determination module is configured to acquire a first image to be mosaiced and a second image to be mosaiced, determine a first common area shared by the first image to be mosaiced and the second image to be mosaiced and calculate a first color average value of the first image to be mosaiced in the first common area and a second average color value of the second image to be mosaiced in the first common area;

the second determination module is configured to determine a target average value of the first common area based on the first color average value and the second color average value, and determine an adjustment parameter of the first common area according to the target average value of the first common area and the first color average value and/or the second color average value;

the first calculation module is configured to acquire a third image to be mosaiced, determine a second common area shared by the second image to be mosaiced and the third image to be mosaiced, and calculate a third color average value of the second image to be mosaiced in the second common area and a fourth color average value of the third image to be mosaiced in the second common area;

the third determination module is configured to determine a target average value of the second common area based on the third color average value and the fourth color average value, and determine an adjustment parameter of the second common area according to the target average value of the second common area and the third color average value and/or the fourth color average value;

the fourth determination module is configured to determine an adjustment parameter of the first central area of the second image to be mosaiced located between the first common area and the second common area according to the adjustment parameter of the first common area and the adjustment parameter of the second common area;

the adjustment module is configured to adjust a display image of the first common area based on the adjustment parameter of the first common area, adjust a display image of the second common area based on the adjustment parameter of the second common area, and adjust a display image of the first central area based on the adjustment parameter of the first central area.

Figure 8:
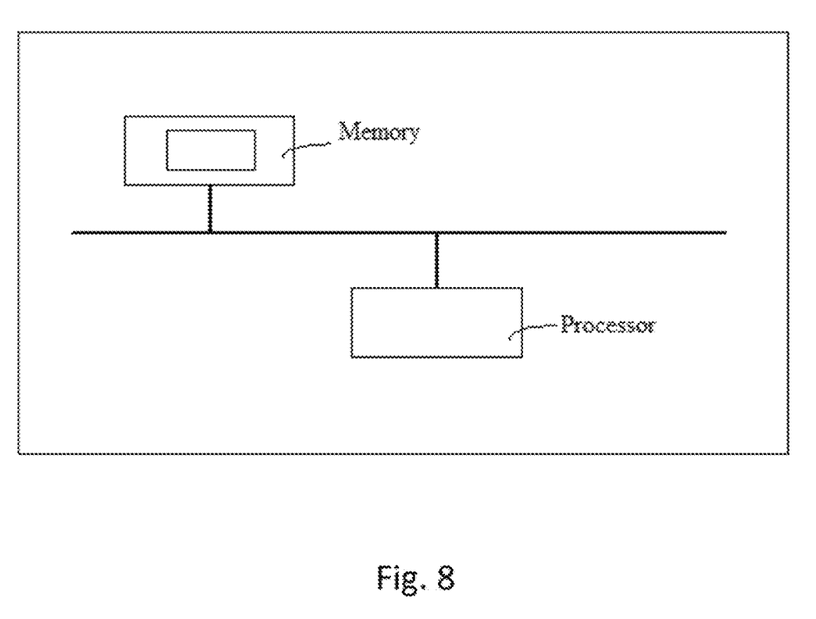
FIG. 8 shows a computer system architecture diagram according to one embodiment of the present disclosure.

In one embodiment, as shown in FIG. 8, it also provides a computer device, which comprises a memory and a processor, wherein the memory stores a computer program, and the processor implements the following steps when executing the computer program:

acquiring a first image to be mosaiced and a second image to be mosaiced, determining a first common area shared by the first image to be mosaiced and the second image to be mosaiced and calculating a first color average value of the first image to be mosaiced in the first common area and a second color average value of the second image to be mosaiced in the first common area;

determining a target average value of the first common area based on the first color average value and the second color average value, and determining an adjustment parameter of the first common area according to the target average value of the first common area and the first color average value and/or the second color average value;

acquiring a third image to be mosaiced, determining a second common area shared by the second image to be mosaiced and the third image to be mosaiced, and calculating a third color average value of the second image to be mosaiced in the second common area and a fourth color average value of the third image to be mosaiced in the second common area;

determining a target average value of the second common area based on the third color average value and the fourth color average value, and determining an adjustment parameter of the second common area according to the target average value of the second common area and the third color average value and/or fourth color average value;

determining an adjustment parameter of a first central area of the second image to be mosaiced located between the first common area and the second common area according to the adjustment parameter of the first common area and the adjustment parameter of the second common area;

adjusting a display image of the first common area based on the adjustment parameter of the first common area, adjusting a display image of the second common area based on adjustment parameter of the second common area, and adjusting a display image of the first central area based on adjustment parameter of the first central area.

In addition, when the processor executes the computer program, it also implements other steps mentioned in the above method.

In one embodiment, it also provides a computer readable storage medium on which a computer program is stored, and when the computer program is executed by a processor, the following steps are realized:

acquiring a first image to be mosaiced and a second image to be mosaiced, determining a first common area shared by the first image to be mosaiced and the second image to be mosaiced and calculating a first color average value of the first image to be mosaiced in the first common area and a second color average value of the second image to be mosaiced in the first common area;

determining a target average value of the first common area based on the first color average value and the second color average value, and determining an adjustment parameter of the first common area according to the target average value of the first common area and the first color average value and/or the second color average value;

acquiring a third image to be mosaiced, determining a second common area shared by the second image to be mosaiced and the third image to be mosaiced, and calculating a third color average value of the second image to be mosaiced in the second common area and a fourth color average value of the third image to be mosaiced in the second common area;

determining a target average value of the second common area based on the third color average value and the fourth color average value, and determining an adjustment parameter of the second common area according to the target average value of the second common area and the third color average value and/or fourth color average value;

determining an adjustment parameter of a first central area of the second image to be mosaiced located between the first common area and the second common area according to the adjustment parameter of the first common area and the adjustment parameter of the second common area;

adjusting a display image of the first common area based on the adjustment parameter of the first common area, adjusting a display image of the second common area based on the adjustment parameter of the second common area, and adjusting a display image of the first central area based on the adjustment parameter of the first central area.

In addition, when the computer program is executed by the processor, other steps mentioned in the above method are also implemented.

Those of ordinary skill in the art can understand that all or part of the process of the method for realizing the above embodiments can be completed by instructing related hardware through a computer program, which can be stored in a nonvolatile computer readable storage medium, and the computer program when executed can include the process of the above embodiments. Herein, any reference to memory, storage, database or other media used in the embodiments provided by this disclosure may include at least one of nonvolatile and volatile memory. The nonvolatile memory can include Read-Only Memory (ROM), magnetic tape, floppy disk, flash memory or optical memory. The volatile memory may include a Random Access Memory (RAM) or an external cache memory. By way of illustration, and not limitation, the RAM can be in various forms, such as Static Random Access Memory (SRAM) or Dynamic Random Access Memory (DRAM).

The technical features of the above-mentioned embodiments can be combined arbitrarily. In order to make the description concise, not all possible combinations of the technical features in the above-mentioned embodiments are described. However, as long as there is no contradiction between the combinations of these technical features, they should be considered as in the scope described in this specification.

The above-mentioned embodiments only express several embodiments of the present disclosure, and their descriptions are specific and detailed, but they cannot be understood as limiting the scope of the current disclosure. It should be pointed out that for those of ordinary skill in the art, without departing from the concept of this disclosure, several modifications and improvements can be made, which belong to the protection scope of this disclosure. Therefore, the scope of protection of the disclosed patent shall be subject to the appended claims.

What is claimed is:

1. A method for adjusting brightness of mosaiced images, comprising:

acquiring a first image to be mosaiced and a second image to be mosaiced, determining a first common area shared by the first image to be mosaiced and the second image to be mosaiced and calculating a first color average value of the first image to be mosaiced in the first common area and a second color average value of the second image to be mosaiced in the first common area;

determining a target average value of the first common area based on the first color average value and the second color average value and determining an adjustment parameter of the first common area according to the target average value of the first common area and the first color average value and/or the second color average value;

acquiring a third image to be mosaiced, determining a second common area shared by the second image to be mosaiced and the third image to be mosaiced, and calculating a third color average value of the second image to be mosaiced in the second common area and a fourth color average value of the third image to be mosaiced in the second common area;

determining a target average value of the second common area based on the third color average value and the fourth color average value, and determining an adjustment parameter of the second common area according to the target average value of the second common area and the third color average value and/or fourth color average value;

determining an adjustment parameter of a first central area of the second image to be mosaiced located between the first common area and the second common area according to the adjustment parameter of the first common area and the adjustment parameter of the second common area; and adjusting a display image, comprising:
applying the adjustment parameter of the first common area to the first common area shared by the first image and the second image,
applying the adjustment parameter of the second common area to the second common area shared by the second image and the third image, and
applying the adjustment parameter of the first central area to the first central area of the second image;

wherein the first color average value, the second color average value, the third color average value and the fourth color average value comprise one or more of red color average value, green color average value, or blue color average value.

2. The method for adjusting brightness of mosaiced images according to claim 1, further comprising:

acquiring a fourth image to be mosaiced, determining a third common area shared by the fourth image to be mosaiced and the third image to be mosaiced, and calculating a fifth color average value of the third image to be mosaiced in the third common area and a sixth color average value of the fourth image to be mosaiced in the third common area;

determining a target average value of the third common area based on the fifth color average value and the sixth color average value, and determining an adjustment parameter of the third common area according to the target average value of the third common area and the fifth color average value and/or sixth color average value;

determining an adjustment parameter of a second central area of the third image to be mosaiced located between the second common area and the third common area according to the adjustment parameter of the second common area and the adjustment parameter of the third common area; and adjusting a display image of the third common area based on the adjustment parameter of the third common area, and adjusting a display image of the second central area based on the adjustment parameter of the second central area.

3. The method for adjusting brightness of mosaiced images according to claim 2, further comprising:
determining a fourth common area shared by the fourth image to be mosaiced and the first image to be mosaiced, and calculating a seventh color average value of the fourth image to be mosaiced in the fourth common area and an eighth color average value of the first image to be mosaiced in the fourth common area;
determining a target average value of the fourth common area based on the seventh color average value and the eighth color average value, and determining an adjustment parameter of the fourth common area according to the target average value of the fourth common area and the seventh color average value and/or eighth color average value;
determining an adjustment parameter of a third central area of the fourth image to be mosaiced located between the third common area and the fourth common area according to the adjustment parameter of the third common area and the adjustment parameter of the fourth common area;
determining an adjustment parameter of a fourth central area of the first image to be mosaiced located between the fourth common area and the first common area according to the adjustment parameter of the fourth common area and the adjustment parameter of the first common area; and
adjusting a display image of the fourth common area based on the adjustment parameter of the fourth common area, adjusting a display image of the third central area based on the adjustment parameter of the third central area, and adjusting a display image of the fourth central area based on the adjustment parameter of the fourth central area.

4. The method for adjusting brightness of mosaiced images according to claim 2, wherein the first image to be mosaiced, the second image to be mosaiced, the third image to be mosaiced and the fourth image to be mosaiced are images around a vehicle.

5. The method for adjusting brightness of mosaiced images according to claim 3, wherein adjusting the display image of the first common area based on the adjustment parameter of the first common area comprises adjusting the first image to be mosaiced or the second image to be mosaiced using the adjustment parameter of the first common area to acquire the display image of the first common area;
adjusting the display image of the second common area based on the adjustment parameter of the second common area comprises adjusting the second image to be mosaiced or the third image to be mosaiced using the adjustment parameter of the second common area to acquire the display image of the second common area;
adjusting the display image of the third common area based on the adjustment parameter of the third common area comprises adjusting the third image to be mosaiced or the fourth image to be mosaiced using the adjustment parameter of the third common area to acquire the display image of the third common area; and
adjusting the display image of the fourth common area based on the adjustment parameter of the fourth common area comprises adjusting the fourth image to be mosaiced or the first image to be mosaiced using the adjustment parameter of the fourth common area to acquire the display image of the fourth common area.

6. The method for adjusting brightness of mosaiced images according to claim 1, wherein determining the adjustment parameter of the first central area of the second image to be mosaiced located between the first common area and the second common area according to the adjustment parameter of the first common area and the adjustment parameter of the second common area comprises:
taking an average value of the adjustment parameter of the first common area and the adjustment parameter of the second common area as the adjustment parameter of the first central area.

7. The method for adjusting brightness of mosaiced images according to claim 2, wherein determining the adjustment parameter of the first central area of the second image to be mosaiced located between the first common area and the second common area according to the adjustment parameter of the first common area and the adjustment parameter of the second common area comprises:
determining a plurality of adjustment parameters of the first central area by adopting a linear interpolation algorithm according to the adjustment parameter of the first common area and the adjustment parameter of the second common area.

8. The method for adjusting brightness of mosaiced images according to claim 2, further comprising:
performing distortion correction and perspective projection processing on original images to acquire the first image to be mosaiced, the second image to be mosaiced, the third image to be mosaiced and the fourth image to be mosaiced.

9. The method for adjusting brightness of mosaiced images according to claim 2, wherein the first image to be mosaiced, the second image to be mosaiced, the third image to be mosaiced, and the fourth image to be mosaiced are top views in a certain direction obtained by respectively projecting the original images of a plurality of cameras onto the ground using internal parameters and external parameters of the cameras;
the internal parameters can comprise focal length, pixel size and distortion coefficient;
the external parameters may include a position and a rotation direction of the camera.

10. The method for adjusting brightness of mosaiced images according to claim 1, further comprising:
acquiring at least one of the adjustment parameter of the first common area, the adjustment parameter of the second common area and the adjustment parameter of the first central area of the Nth frame, where N is a natural number greater than or equal to 1;
acquiring at least one of the adjustment parameter of the first common area, the adjustment parameter of the second common area and the adjustment parameter of the first central area of the (N+M)th frame, wherein M is a natural number greater than 2; and
according to at least one of the adjustment parameter of the first common area the adjustment parameter of the second common area and the adjustment parameter of the first central area of the Nth frame and at least one of the adjustment parameter of the first common area, the adjustment parameter of the second common area and the adjustment parameter of the first central area of the (N+M)th frame, determining an adjustment parameter of each frame between the Nth frame and the (N+M)th frame based on a first-order filtering algorithm.

11. An apparatus for adjusting brightness of mosaiced images, the apparatus comprising:
a first determination module configured to acquire a first image to be mosaiced and a second image to be mosaiced, determine a first common area shared by the first image to be mosaiced and the second image to be mosaiced and calculate a first color average value of the first image to be mosaiced in the first common area and a second average color value of the second image to be mosaiced in the first common area;
a second determination module configured to determine a target average value of the first common area based on the first color average value and the second color average value, and determine an adjustment parameter of the first common area according to the target average value of the first common area and the first color average value and/or the second color average value;
a first calculation module configured to acquire a third image to be mosaiced, determine a second common area shared by the second image to be mosaiced and the third image to be mosaiced, and calculate a third color average value of the second image to be mosaiced in the second common area and a fourth color average value of the third image to be mosaiced in the second common area;
a third determination module configured to determine a target average value of the second common area based on the third color average value and the fourth color average value, and determine an adjustment parameter of the second common area according to the target average value of the second common area and the third color average value and/or fourth color average value;
a fourth determination module configured to determine an adjustment parameter of a first central area of the second image to be mosaiced located between the first common area and the second common area according to the adjustment parameter of the first common area and the adjustment parameter of the second common area; and
an adjustment module configured to adjust a display image comprising:
applying the adjustment parameter of the first common area to the first common area shared by the first image and the second image,
applying the adjustment parameter of the second common area to the second common area shared by the second image and the third image, and
applying the adjustment parameter of the first central area to the first central area of the second image;
wherein the first color average value, the second color average value, the third color average value and the fourth color average value comprise one or more of red color average value, green color average value, or blue color average value.

12. A computer device comprising a memory and a processor, wherein the memory stores a computer program, characterized in that the processor executes the computer program to perform operations for adjusting brightness of mosaiced images, the operations comprising:
acquiring a first image to be mosaiced and a second image to be mosaiced, determining a first common area shared by the first image to be mosaiced and the second image to be mosaiced and calculating a first color average value of the first image to be mosaiced in the first common area and a second color average value of the second image to be mosaiced in the first common area;
determining a target average value of the first common area based on the first color average value and the second color average value, and determining an adjustment parameter of the first common area according to the target average value of the first common area and the first color average value and/or the second color average value;
acquiring a third image to be mosaiced, determining a second common area shared by the second image to be mosaiced and the third image to be mosaiced, and calculating a third color average value of the second image to be mosaiced in the second common area and a fourth color average value of the third image to be mosaiced in the second common area;
determining a target average value of the second common area based on the third color average value and the fourth color average value, and determining an adjustment parameter of the second common area according to the target average value of the second common area and the third color average value and/or fourth color average value;
determining an adjustment parameter of a first central area of the second image to be mosaiced located between the first common area and the second common area according to the adjustment parameter of the first common area and the adjustment parameter of the second common area; and
adjusting a display image comprising:
applying the adjustment parameter of the first common area to the first common area shared by the first image and the second image,
applying the adjustment parameter of the second common area to the second common area shared by the second image and the third image, and
applying the adjustment parameter of the first central area to the first central area of the second image;
wherein the first color average value, the second color average value, the third color average value and the fourth color average value comprise one or more of red color average value, green color average value, or blue color average value.

13. A non-transitory computer readable storage medium on which a computer program is stored, characterized in that the computer program, when executed by a processor, implements operations for adjusting brightness of mosaiced images, the operations comprising:
acquiring a first image to be mosaiced and a second image to be mosaiced, determining a first common area shared by the first image to be mosaiced and the second image to be mosaiced and calculating a first color average value of the first image to be mosaiced in the first common area and a second color average value of the second image to be mosaiced in the first common area;
determining a target average value of the first common area based on the first color average value and the second color average value, and determining an adjust parameter of the first common area according to the target average value of the first common area and the first color average value and/or the second color average value;

acquiring a third image to be mosaiced, determining a second common area shared by the second image to be mosaiced and the third image to be mosaiced, and calculating a third color average value of the second image to be mosaiced in the second common area and a fourth color average value of the third image to be mosaiced in the second common area;

determining a target average value of the second common area based on the third color average value and the fourth color average value, and determining an adjustment parameter of the second common area according to the target average value of the second common area and the third color average value and/or fourth color average value;

determining an adjustment parameter of a first central area of the second image to be mosaiced located between the first common area and the second common area according to the adjustment parameter of the first common area and the adjustment parameter of the second common area; and adjusting a display image comprising:
applying the adjustment parameter of the first common area to the first common area shared by the first image and the second image,
applying the adjustment parameter of the second common area to the second common area shared by the second image and the third image, and
applying the adjustment parameter of the first central area to the first central area of the second image;

wherein the first color average value, the second color average value, the third color average value and the fourth color average value comprise one or more of red color average value, green color average value, or blue color average value.

14. The computer device according to claim 12, wherein the operations further comprise:

acquiring a fourth image to be mosaiced, determining a third common area shared by the fourth image to be mosaiced and the third image to be mosaiced, and calculating a fifth color average value of the third image to be mosaiced in the third common area and a sixth color average value of the fourth image to be mosaiced in the third common area;

determining a target average value of the third common area based on the fifth color average value and the sixth color average value, and determining an adjustment parameter of the third common area according to the target average value of the third common area and the fifth color average value and/or sixth color average value;

determining an adjustment parameter of a second central area of the third image to be mosaiced located between the second common area and the third common area according to the adjustment parameter of the second common area and the adjustment parameter of the third common area; and adjusting a display image of the third common area based on the adjustment parameter of the third common area, and adjusting a display image of the second central area based on the adjustment parameter of the second central area.

15. The computer device according to claim 14, wherein the operations further comprise:

determining a fourth common area shared by the fourth image to be mosaiced and the first image to be mosaiced, and calculating a seventh color average value of the fourth image to be mosaiced in the fourth common area and an eighth color average value of the first image to be mosaiced in the fourth common area;

determining a target average value of the fourth common area based on the seventh color average value and the eighth color average value, and determining an adjustment parameter of the fourth common area according to the target average value of the fourth common area and the seventh color average value and/or eighth color average value;

determining an adjustment parameter of a third central area of the fourth image to be mosaiced located between the third common area and the fourth common area according to the adjustment parameter of the third common area and the adjustment parameter of the fourth common area;

determining an adjustment parameter of a fourth central area of the first image to be mosaiced located between the fourth common area and the first common area according to the adjustment parameter of the fourth common area and the adjustment parameter of the first common area; and adjusting a display image of the fourth common area based on the adjustment parameter of the fourth common area, adjusting a display image of the third central area based on the adjustment parameter of the third central area, and adjusting a display image of the fourth central area based on the adjustment parameter of the fourth central area.

16. The computer device according to claim 14, wherein the first image to be mosaiced, the second image to be mosaiced, the third image to be mosaiced and the fourth image to be mosaiced are images around a vehicle.

17. The computer device according to claim 15, wherein adjusting the display image of the first common area based on the adjustment parameter of the first common area comprises adjusting the first image to be mosaiced or the second image to be mosaiced using the adjustment parameter of the first common area to acquire the display image of the first common area;

adjusting the display image of the second common area based on the adjustment parameter of the second common area comprises adjusting the second image to be mosaiced or the third image to be mosaiced using the adjustment parameter of the second common area to acquire the display image of the second common area;

adjusting the display image of the third common area based on the adjustment parameter of the third common area comprises adjusting the third image to be mosaiced or the fourth image to be mosaiced using the adjustment parameter of the third common area to acquire the display image of the third common area; and adjusting the display image of the fourth common area based on the adjustment parameter of the fourth common area comprises adjusting the fourth image to be mosaiced or the first image to be mosaiced using the adjustment parameter of the fourth common area to acquire the display image of the fourth common area.

18. The non-transitory computer readable storage medium according to claim 13, wherein the operations further comprise:

acquiring a fourth image to be mosaiced, determining a third common area shared by the fourth image to be mosaiced and the third image to be mosaiced, and calculating a fifth color average value of the third image to be mosaiced in the third common area and a sixth color average value of the fourth image to be mosaiced in the third common area;

determining a target average value of the third common area based on the fifth color average value and the sixth color average value, and determining an adjustment parameter of the third common area according to the target average value of the third common area and the fifth color average value and/or sixth color average value;

determining an adjustment parameter of a second central area of the third image to be mosaiced located between the second common area and the third common area according to the adjustment parameter of the second common area and the adjustment parameter of the third common area; and adjusting a display image of the third common area based on the adjustment parameter of the third common area, and adjusting a display image of the second central area based on the adjustment parameter of the second central area.

19. The non-transitory computer readable storage medium according to claim 18, wherein the operations further comprise:

determining a fourth common area shared by the fourth image to be mosaiced and the first image to be mosaiced, and calculating a seventh color average value of the fourth image to be mosaiced in the fourth common area and an eighth color average value of the first image to be mosaiced in the fourth common area;

determining a target average value of the fourth common area based on the seventh color average value and the eighth color average value, and determining an adjustment parameter of the fourth common area according to the target average value of the fourth common area and the seventh color average value and/or eighth color average value;

determining an adjustment parameter of a third central area of the fourth image to be mosaiced located between the third common area and the fourth common area according to the adjustment parameter of the third common area and the adjustment parameter of the fourth common area;

determining an adjustment parameter of a fourth central area of the first image to be mosaiced located between the fourth common area and the first common area according to the adjustment parameter of the fourth common area and the adjustment parameter of the first common area; and adjusting a display image of the fourth common area based on the adjustment parameter of the fourth common area, adjusting a display image of the third central area based on the adjustment parameter of the third central area, and adjusting a display image of the fourth central area based on the adjustment parameter of the fourth central area.

20. The non-transitory computer readable storage medium according to claim 19, wherein adjusting the display image of the first common area based on the adjustment parameter of the first common area comprises adjusting the first image to be mosaiced or the second image to be mosaiced using the adjustment parameter of the first common area to acquire the display image of the first common area;

adjusting the display image of the second common area based on the adjustment parameter of the second common area comprises adjusting the second image to be mosaiced or the third image to be mosaiced using the adjustment parameter of the second common area to acquire the display image of the second common area;

adjusting the display image of the third common area based on the adjustment parameter of the third common area comprises adjusting the third image to be mosaiced or the fourth image to be mosaiced using the adjustment parameter of the third common area to acquire the display image of the third common area; and adjusting the display image of the fourth common area based on the adjustment parameter of the fourth common area comprises adjusting the fourth image to be mosaiced or the first image to be mosaiced using the adjustment parameter of the fourth common area to acquire the display image of the fourth common area.

* * * * *